(12) United States Patent
Zhu et al.

(10) Patent No.: US 12,245,311 B2
(45) Date of Patent: Mar. 4, 2025

(54) METHOD FOR INFLUENCING DATA TRAFFIC ROUTING IN A CORE NETWORK

(71) Applicant: ZTE Corporation, Shenzhen (CN)

(72) Inventors: Jinguo Zhu, Shenzhen (CN); Xiaojian Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 17/738,351

(22) Filed: May 6, 2022

(65) Prior Publication Data

US 2022/0264690 A1    Aug. 18, 2022

Related U.S. Application Data

(63) Continuation of application No. PCT/CN2019/116559, filed on Nov. 8, 2019.

(51) Int. Cl.
*H04W 76/22* (2018.01)
*H04W 4/029* (2018.01)
(Continued)

(52) U.S. Cl.
CPC ........... *H04W 76/22* (2018.02); *H04W 4/029* (2018.02); *H04W 76/11* (2018.02); *H04W 88/14* (2013.01)

(58) Field of Classification Search
CPC ..... H04W 76/22; H04W 4/029; H04W 76/11; H04W 88/14; H04W 12/088; H04W 4/02;
(Continued)

(56) References Cited

U.S. PATENT DOCUMENTS

| 10,285,155 B1 | 5/2019 | Stojanovski et al. |
| 2018/0192390 A1* | 7/2018 | Li .......................... H04W 28/02 |

(Continued)

FOREIGN PATENT DOCUMENTS

| CN | 109673005 A | 4/2019 |
| CN | 110048873 A | 7/2019 |

(Continued)

OTHER PUBLICATIONS

Indian First Examination Report issued Sep. 7, 2022 in corresponding Indian Patent Application No. 202217025736.
(Continued)

*Primary Examiner* — Shailendra Kumar
(74) *Attorney, Agent, or Firm* — Crowell & Moring LLP

(57) ABSTRACT

This disclosure relates to a method for effectuating data traffic routing influence for a relocated application service in a core network of a communication system. In an embodiment, the core network may include a communication session control node and an application service node. The method may include transmitting, by the communication session control node, a message to the application service node for notifying a relocation triggering event. The relocation triggering event triggers the application service node to relocate an application service provided to a user equipment in a pre-established communication session from a previous application hosting server to a new application hosting server outside of the mobile core network. The method may further include receiving, by the communication session control node, a relocation information from the application service node such that the communication session control node may reconfigure and modify the data traffic routing for the relocated application service.

15 Claims, 7 Drawing Sheets

(51) Int. Cl.
*H04W 76/11* (2018.01)
*H04W 88/14* (2009.01)

(58) Field of Classification Search
CPC ..... H04W 92/24; H04W 28/08; H04W 76/25; H04L 65/1063; H04L 65/1095; H04L 67/148
See application file for complete search history.

(56) References Cited

U.S. PATENT DOCUMENTS

| | | | |
|---|---|---|---|
| 2019/0158408 A1 | 5/2019 | Li et al. | |
| 2019/0274185 A1* | 9/2019 | Stojanovski | H04L 47/2441 |
| 2022/0360977 A1* | 11/2022 | Kim | H04L 65/80 |

FOREIGN PATENT DOCUMENTS

| | | |
|---|---|---|
| CN | 110169089 A | 8/2019 |
| EP | 4 013 010 | 6/2022 |
| WO | WO 2019035406 | 2/2019 |

OTHER PUBLICATIONS

Extended European Search Report issued Jan. 2, 2023 in corresponding European Patent Application No. 19952097.4.
Anonymous: "3rd Generation Partnership Project; Technical Specification Group Services and System Aspects; Procedures for the 5G System (SGS); Stage 2 (Release 16)", 3GPP Standard; Technical Specification; 3GPP TS 23.502, 3rd Generation Partnership Project (3GPP), Mobile Competence Centre; 650, Route Des Lucioles; F-06921 Sophia-Antipolis Cedex; France, No. V16.2.0, Sep. 24, 2019 (Sep. 24, 2019), pp. 1-525, XP051784671.
International Search Report and Written Opinion regarding PCT/CN2019/116559 dated Jun. 10, 2020.
Communication from the Examining Division dated Feb. 8, 2024 from European Application No. 19 952 097.4 (14 pages).
Ericsson, "Procedure Updates for Solution 1 in 23.725 for User Plane Redundancy," Feb. 2019, 3GPP TSG-SA WG2 Meeting #131, 24 pages.
Office action in Chinese application No. 201980101766.X, dated Jun. 29, 2024, 18 pages (with English translation).

* cited by examiner

METHOD FOR INFLUENCING DATA TRAFFIC ROUTING IN A CORE NETWORK

This application is a continuation application of PCT International Application No. PCT/CN2019/116559, filed with the China National Intellectual Property Administration, PRC on Nov. 8, 2019, which is herein incorporated by reference in its entirety.

TECHNICAL FIELD

This disclosure is generally directed to mechanisms for influencing data traffic routing in a core communication network, and is particularly directed to mechanisms for enabling data traffic offloading towards an application service when the application service is relocated.

BACKGROUND

A wireless or wireline communication system may include a core network. A core network provides various network nodes for provisioning and routing data traffic between user equipment (UE) and application service. The application service may be hosted in an application server outside the core network. When the UE moves away from the application server, it is desirable that the application service is relocated to a new application server hosting such application service geographically close to the UE. As such, the core network needs to influence a new data traffic routing for offloading UE data traffic to the new application server.

SUMMARY

This disclosure relates to methods, systems, and devices for enabling data traffic offloading towards an application service when the application service is relocated.

In one embodiment, a method performed in a mobile core network is disclosed. The mobile core network may include a communication session control node and an application service node. The method may include transmitting, by the communication session control node, a message to the application service node for notifying a relocation triggering event. The relocation triggering event triggers the application service node to relocate an application service provided to a user equipment in a pre-established communication session from a previous application hosting server to a new application hosting server outside of the mobile core network. The method may further include receiving, by the communication session control node, a relocation information from the application service node. The relocation information may include a network address of the new application hosting server.

In another embodiment, a method performed in a mobile core network is disclosed. The mobile core network may include a communication session control node and an application service node. The method may include receiving, by the application service node, from the communication session control node a message for notifying a relocation triggering event. The method may further include, in response to the relocation triggering event, relocating, by the application service node, an application service provided to a user equipment in pre-established communication session from a previous application hosting server to a new application hosting server outside of the mobile core network. The method may further include transmitting, by the application service node, a relocation information to the communication session control node. The relocation information may include a network address of the new application hosting server.

In another embodiment, a method performed in a mobile core network is disclosed. The mobile core network may include a communication session control node and an application service node. The method may include, in response that an application service provided to a user equipment in pre-established communication session is relocated from a previous application hosting server to a new application hosting server outside the mobile core network, generating, by the application service node, a request for updating the application service relocation. The request may include a network address of the new application hosting server. The method may further include transmitting, by the application service node, the request to the communication session control node.

In another embodiment, a method performed in a mobile core network is disclosed. The mobile core network may include a communication session control node and an application service node. The method may include receiving, by the communication session control node, from the application service node a request for updating an application service relocation that an application service provided to a user equipment in pre-established communication session is relocated to a new application hosting server outside the mobile core network. The request comprises a network address of the new application hosting server. The method may further include transmitting, by the communication session control node, the network address of the new application hosting server to the intermediate user plane node.

In some other embodiments, one or more core network nodes may include one or more memories storing instructions and one or more processors in communication with the one or more memories. The one or more processors are configured to read instructions from the one or more memories to carry out the above methods.

In some other embodiments, a computer program product may include a non-transitory computer-readable program medium with computer code stored thereupon. The computer code, when executed by one or more processors, causing the one or more processors to carry out the above methods.

The above embodiments and other aspects and alternatives of their implementations are explained in greater detail in the drawings, the descriptions, and the claims below.

DETAILED DESCRIPTION

Figure 1:
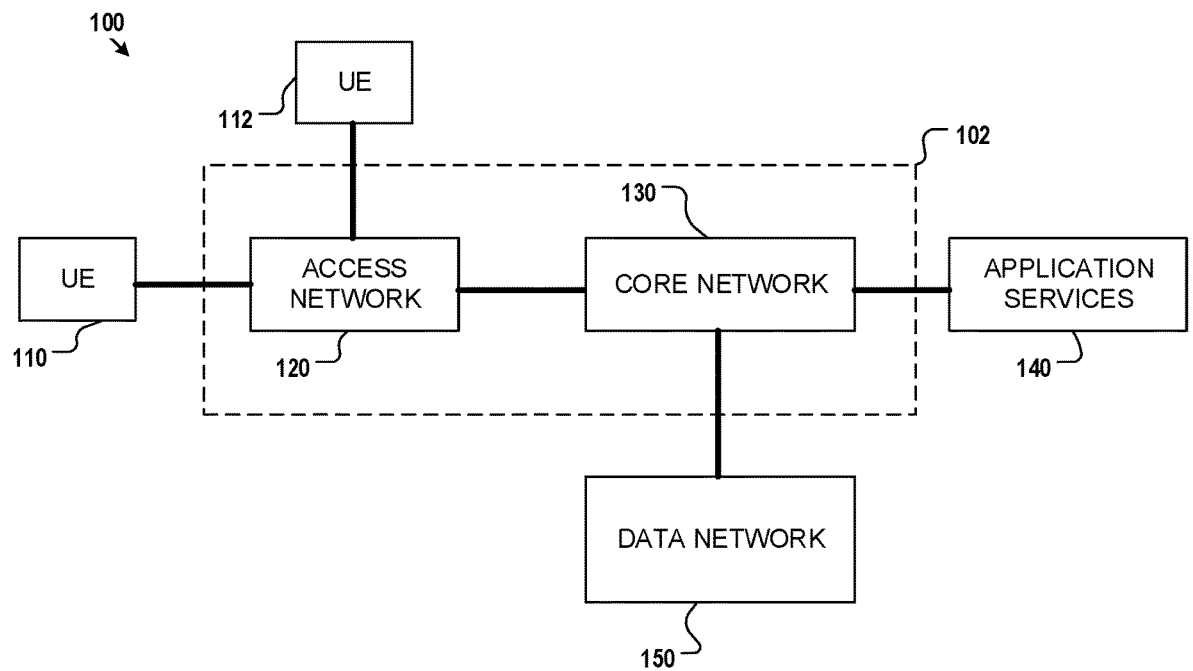
FIG. 1 shows an example communication network system including a carrier communication network containing an access network and a core network.

A communication network, shown as 100 in FIG. 1, may include user equipment (UE) 110 and 112, a carrier network 102, various application services 140, and other data networks 150. The carrier network 102, for example, may include access networks 120 and core network 130. The carrier network 102 may be configured to transmit voice, data, and other information (collectively referred to as data traffic) among UEs 110 and 112, between the UEs and the application services 140, or between the UEs and the other data networks 150. The access networks 120 may be configured to interact with the UEs on one side of a communication session and the core network 130 on the other. The core network 130 may include various network nodes being configured to control communication sessions and perform network access management and traffic routing. The application services 140 may be hosted by various application servers that are accessible by the UEs through the core network 130 of the carrier network 102. An application service 140 may be deployed as a data network outside of the core network 130. Likewise, the other data networks 150 may be accessible by the UEs through the core network 130 and appear as either data destination or origin of a particular communication session instantiated in the carrier network 102.

The core network 130 of FIG. 1 may include various network nodes geographically distributed and interconnected to provide network coverage of a service region of the carrier network 102. These network nodes may be implemented as dedicated hardware network nodes. Alternatively, these network nodes may be virtualized and implemented as virtual machines or as software entities. These network nodes may each be configured with one or more types of network functions which collectively provide the provisioning and routing functionalities of the core network 130.

Figure 2:
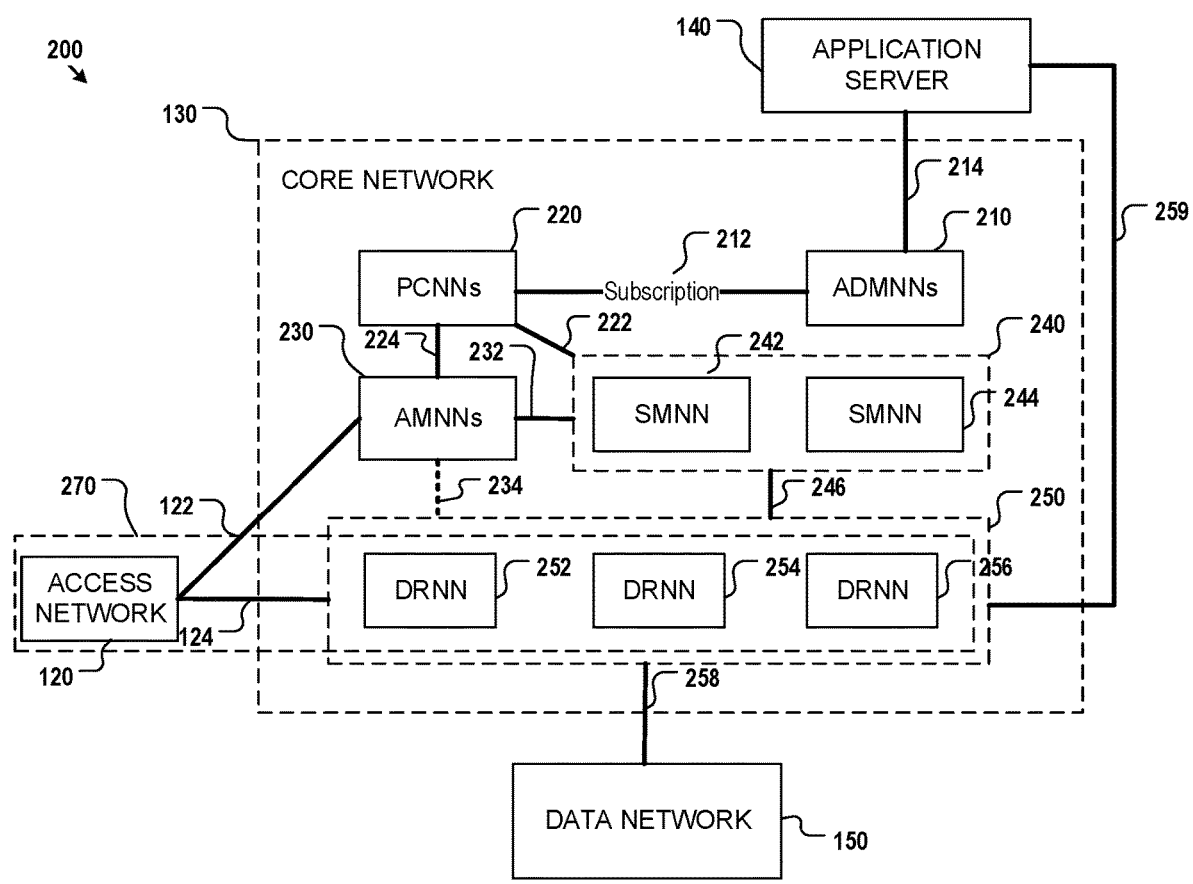
FIG. 2 shows an example core network that supports data traffic routing influence.

FIG. 2 shows an example division of network node functions in the core network 130. While only single instances of network nodes for some functions are illustrated in FIG. 2, those having ordinary skill in the art understand that each of these network nodes may be instantiated as multiple instances that are distributed throughout the core network 130. As shown in FIG. 2, the core network 130 may include but are not limited to access management network nodes (AMNNs) 230, session management network nodes (SMNNs) 240, data routing network nodes (DRNNs) 250, policy control network nodes (PCNNs) 220, and application data management network nodes (ADMNNs) 210.

The access management network nodes 230 communicate with the access network 120, the session management network nodes 240, and the policy control network nodes 220 respectively via communication interfaces 122, 232, and 224, and may be responsible for provisioning registration, authentication, and access by UE to the core network 130 as well as allocation of session management network nodes 240 to support a particular UE communication need. The session management network nodes 240 allocated by the access management network nodes 230 in turn may be responsible for allocating data routing network nodes 250 for supporting the particular UE communication need and controlling these allocated data routing network nodes 250 via communication interface 246. Alternatively or additionally in some implementations, the data routing network nodes 250 may be directly allocated by the access management network nodes 230 via the interface 234 and controlled by the session management network 242 via the communication interface 246. Access policies and session routing policies applicable to the UEs may be managed by the policy control network nodes 220 which communicate the policies to the access management network nodes 230 and the session management network nodes 240 via communication interfaces 224 and 222, respectively. The signaling and data exchange between the various types of network nodes through various communication interfaces indicated by the various connection lines in FIG. 2, may be carried by signaling or data messages following predetermined types of format or protocols.

To support a particular end-to-end communication task requested by a UE, a communication session may be established to support a data traffic pipeline for transporting the particular end-to-end communication data traffic. The carrier network portion of the data traffic pipeline, as illustrated by 270 of FIG. 2, may involve one or more network nodes in the access network 120 and a set of data routing network nodes 252, 254, and 256 in the core network 130, as selected and controlled, for example, by a set of session management network nodes 242 and 244 which may be selected and controlled by the access management network nodes 230 that are responsible for establishing and managing the communication session. Data traffic is routed among a UE at one end of the data traffic pipeline, the carrier network portion of the data traffic pipeline (including the set of network nodes in the access network 120 and the selected data routing network nodes 252, 254, and 256 in the core network 130), and another end of the data traffic pipeline including, for example, another UE, the application server 140, or another data network 150, via communication interfaces such as 124, 258, and 259.

For some communication sessions, data transmitted in the core network 130 may terminate on the application server 140 hosting application service. In other words, the application server 140 may be a destination of data traffic routed in the core network 130. Likewise, the application server 140 may also be source of data traffic to be routed by the core network 130 to other destinations. In such a communication session, the application server 140 may be accessed by the carrier network portion 270 of the data traffic pipeline for the communication session, as indicated by 259.

The application server 140 may further communicate other configuration and control information to the core network 130. The information communicated to the core network 130 may be referred to as application data. Such application data may be processed and managed by a specific type of network nodes referred to as the application data management network nodes (ADMNNs) 210 in FIG. 2. The application data may be communicated, for example, in a message from the application server 140 to the application data management network nodes 210 via communication interface 214. Alternatively, the application server 140 may access the application data management network nodes 210 using open APIs provided by the core network 130. While FIG. 2 only shows a single application server, those having ordinary skill understand that in practical implementations, the core network 130 may support a plurality of application services of different types.

The implementations described above in FIGS. 1 and 2 apply to both wireless and wireline communication systems. For a wireless communication system, the access networks 120 would be implemented, for example, as radio access networks (RANs) distributed throughout the service areas of the carrier network 102.

Figure 3:
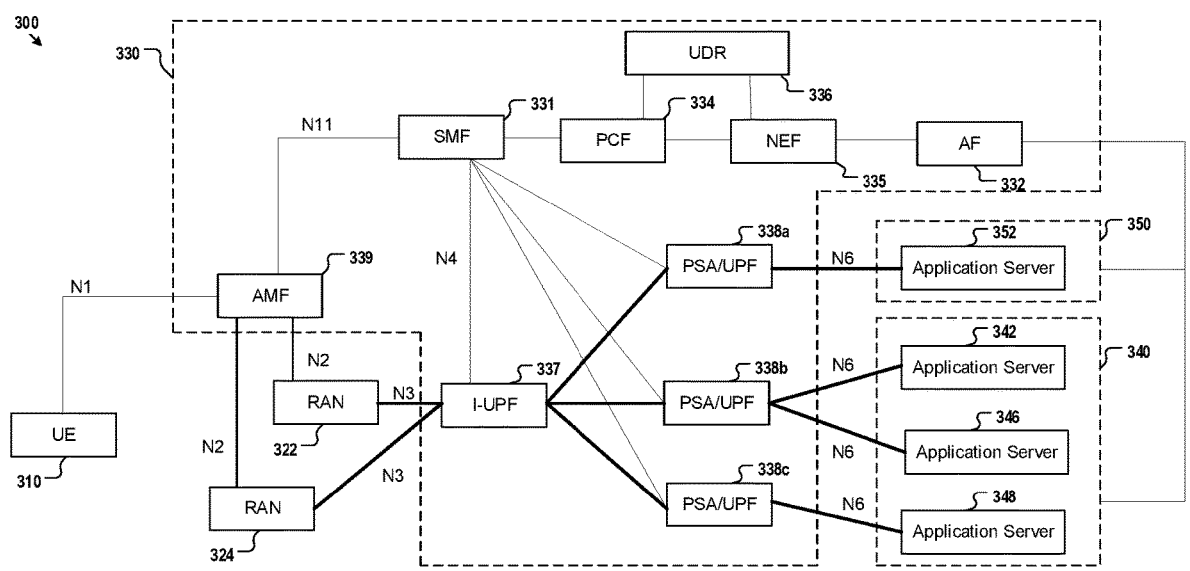
FIG. 3 shows an example wireless core network that supports data traffic routing influence.

FIG. 3 shows an example wireless communication network 300 in which embodiments of the present disclosure may be implemented. As shown in FIG. 3, the wireless communication network 300 may include UE 310, local data network 340, central data network 350, and a carrier network including RAN 322, RAN 324, and core network 330. While only single instances of network nodes for some functions of the wireless network 300 and the core network 330 in particular are illustrated in FIG. 3, those of ordinary skill in the art understand that each of these network nodes may have multiple instances that are distributed throughout the wireless communication network 300.

The RANs 322 and 324, for example, may include a plurality of radio base stations such as those implemented in various generations of cellular wireless networks. For example, the radio base stations may include a 4G LTE base station, a 5G new radio (NR) base station, a 5G central-unit base station, and 5G distributed-unit base station.

The UE 310 may be implemented as various types of mobile devices that are configured to communicate with the RANs 322 and 324 via the over-the-air (OTA) communication channels. The UE 310 may include but is not limited to mobile phones, laptop computers, tablets, Internet-Of-Things (IoT) devices, distributed sensor network nodes, wearable devices, and the like.

As shown in FIG. 3, the core network 330 may include application functions (AF) 332, network exposure functions (NEF) 335, and unified data repository (UDR) functions 336. The network "nodes" in the core network 330 are alternatively referred to herein as network "functions". These three types of network nodes may serve together as the application data management network nodes 210 of FIG. 2. The core network 330 may further include access and mobility management functions (AMF) 339, and session management functions (SMF) 331. The AMF and the SMF serve as the access management network nodes (AMNNs) 230 and the session management network nodes (SMNNs) 240 of FIG. 2, respectively. The SMF 331 may obtain communication policy information from policy control functions (PCF) 334. The PCF 334 serves as the policy control network nodes (PCNNs) 220 of FIG. 2.

As further shown in FIG. 3, SMF 331 controls a plurality of user plane functions (UPF) 337 and 338a-338c. The RANs 322 and 324 and one or more UPFs may be allocated by the core network and form a carrier network portion of a data traffic pipeline (or alternatively, a data traffic path) for a particular communication session. The UPFs 337 and 338a-338c serve as the data routing network nodes (DRNNs) 250 of FIG. 2. The user plan functions may include one or more packet data unit (PDU) session anchor UPFs (PSA/UPFs) 338a-338c and one or more intermediate UPFs (I-UPFs) 337, as will be described in more detail below.

As shown in FIG. 3, application servers 342, 346, and 348 are deployed in a local data network 340 and application server 352 is deployed in central data network 350. These application servers may connect to individual PSA/UPFs of the core network 330 to communicate data traffic between the application servers and the core network 330. A PSA/UPF may connect to one or more application servers. As shown in FIG. 3, PSA/UPF 338a connects to application server 352; PSA/UPF 338b connects to application servers 342 and 346, and PSA/UPF 338c connects to application server 348.

The various network nodes or network functions in FIG. 3 communicate signaling information and data through various communication interfaces as indicated by the various connection lines in FIG. 3 using signaling or data messages following predetermined types of format or protocols. Some example communication interfaces as defined, for example, in the $5^{th}$ generation new radio wireless communication specifications, may be used in the communication network 300 between the various network nodes as indicated by the labels along the connection lines in FIG. 3, including the N1 interface between the UE 310 and the AMF 339, the N2 interface between RANs 322, 324 and the AMF 339, the N3 interface between the RANs 322, 324 and the I-UPF 337, the N4 interface between the SMF 331 and I-UPF 337, the N6 interface between PSA/UPFs 338a-338c and application servers 342, 346, 348, and 352, and the N11 interface between the AMF 339 and the SMF 331.

Examples of the functionality of the various network nodes and network functions in the wireless communication network 300 of FIG. 3 are described in more detail below:

1) AMF (Access and Mobility Management function) 339. These network nodes perform the functionalities including but not limited to registration management, connection management, reachability management and mobility management of UE 310. These network nodes also perform access authentication and access authorization. The AMF 339 may function as non-access stratum (NAS) security termination and relay the session management NAS messages between the UE 310 and SMF 331.

2) SMF (Session Management Function) 331. These network nodes perform the functionalities including but not limited to establishment, modification, and release of communication sessions, UE internet protocol (IP) address allocation and management (including optional authorization functions), selection and control of PSA/UPFs 338a-338c, and downlink data notification.

3) UPF (User plane function) 337 and 338a-338c. These network nodes perform the functionalities including but not limited to serving as an anchor point for intra-/inter-radio access technology (RAT) mobility, packet routing and forwarding, traffic usage reporting, quality of service (QoS) handling for the user plane, downlink packet buffering and downlink data notification triggering. UPF may be deployed as I-UPF and PSA/UPF. PSA/UPF is the UPF terminating the N6 interface towards the data network. The I-UPF provides traffic forwarding between the RAN and the PSA/UPF. The I-UPF may support uplink classifier (ULCL) or branching point (BP) to offload some data traffic to local PSA/UPF. The ULCL offloads uplink traffic based on target IP address of the traffic. The BP offloads uplink traffic based on source IP address of the traffic.

4) PCF (Policy Control Function) 334. These network nodes perform the functionalities including but not limited providing policy rules and controlling UPFs to enforce the policy rules. Specifically, the PCF 334 transforms the Application Function (AF, see below) requests into policies that apply to PDU sessions. The PCF 334 provides the AF influenced traffic steering enforcement control in policy control and charge (PCC) rules to the SMF 331 such that the SMF 331 can establish the data path to offload the traffic to the local data network 340, as will be described in more detail below.

5) UDR (Unified Data Repository) 336. These network nodes may support but not limited to the storage and retrieval of structured data for network exposure, application data such as AF request information for multiple UEs. When application data is updated, the UDR may send notification to PCF 334 if the PCF 334 has subscribed the change. The PCF may also retrieve the application data from the UDR 336.

6) NEF (Network Exposure Function) 335. These network nodes may store and retrieve information as structured data using a standardized interface (e.g., Nudr interface) to UDR 336. The NEF 335 may provide a means for the AF 332 (see below) to securely provide various information to the core network 330, including but not limited to information with respect to application influence on data traffic routing. The NEF 335 may authenticate, authorize and assist in throttling requests from the AF 332.

7) AF (Application Function) 332. These network nodes may interact with the core network 330 in order to serve application services, for example, to support application influence on data traffic routing. An AF 332 may interact with the application services on one end and the network functions in the core network 330 via NEF 335 on the other end. In some implementations, an AF 332 considered as trusted by the core network 330 may bypass the NEF 335 and interact directly with other relevant network functions in the core network 330.

The various network nodes or functions described above and depicted in FIG. 3 may be configured to enable, in a collaborative manner, data traffic offloading towards an application service in the core network 330.

Figure 4:
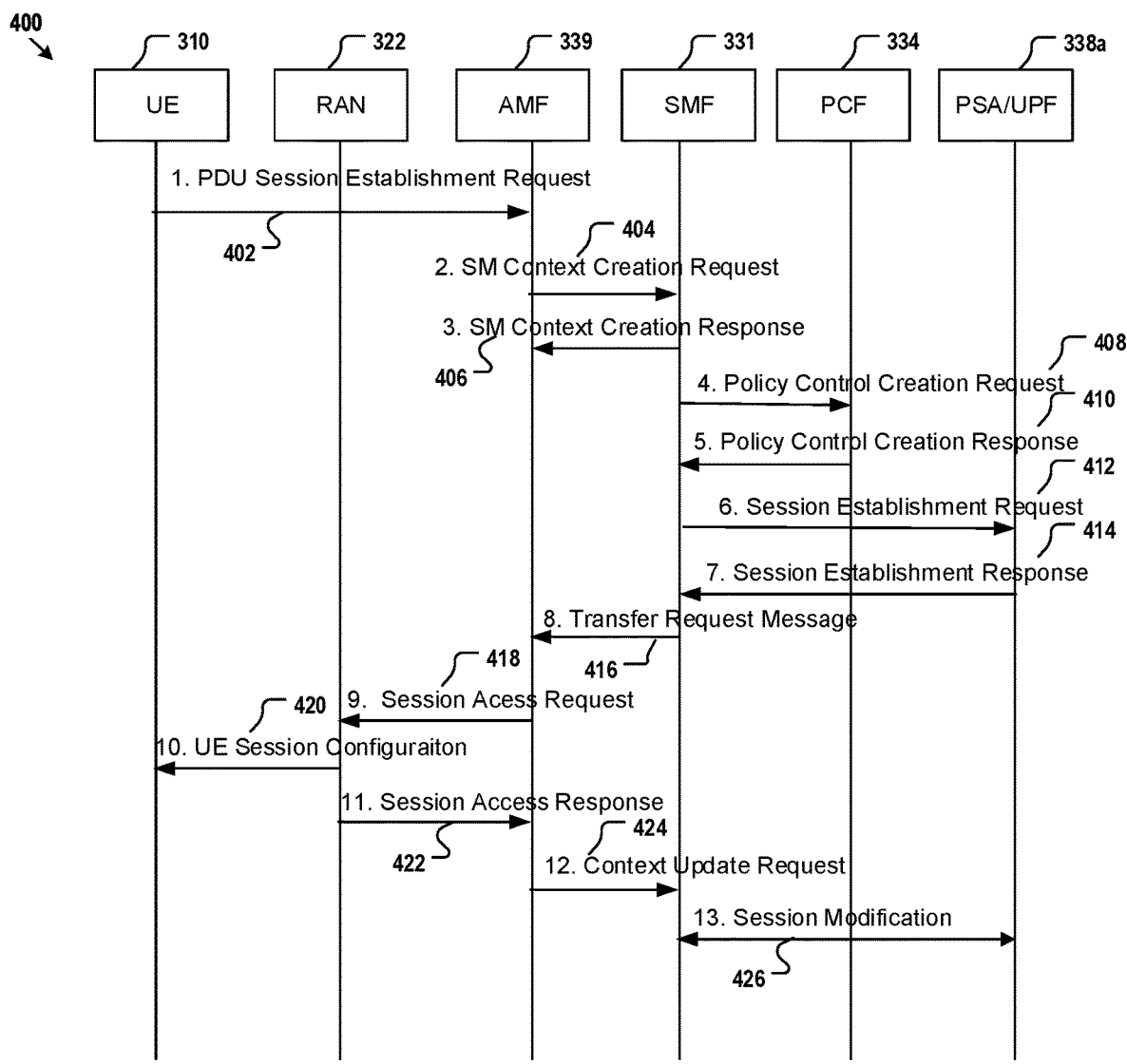
FIG. 4 illustrates an example data and logic flow for establishing and configuring network nodes for a communication session in a core network that supports data traffic routing influence.

FIG. 4 illustrates an example data and logic flow 400 in establishing and configuring network nodes for a new PDU session in the core network 330 when the UE 310 access the core network 330 via the RAN 322. The example data and logic follow 400 may include the following steps.

1. In order to establish a new PDU session, the UE 310 generates a new PDU session ID. The UE 310 sends a PDU session establishment request 402 to the AMF 339 via the RAN 322. For example, this request may be carried by a non-access-stratum (NAS) message between the core network and the UE 310. The message may include information such as data network name (DNN), the new PDU session ID, and the PDU session establishment request. In some implementations, the PDU session establishment request is encapsulated in a N1 session management (SM) container for transmission.

2. The AMF 339 selects the SMF 331 based on the requested DNN. Then, the AMF 339 sends a SM context creation request message 404 to the SMF 331 for requesting creation of a SM context for the new PDU session. The SM context creation message 404, for example, may include information such as subscription permanent identifier (SUPI), DNN, PDU session ID, AMF ID, and N1 SM container containing the PDU session establishment request 402. The SUPI uniquely identifies the UE subscription. The AMF ID is the UE's globally unique AMF ID (GUAMI) which uniquely identifies the AMF serving the UE.

3. Upon receiving the SM context creation request message 404 from the AMF 339, if the SMF 331 is able to process the PDU Session establishment request, the SMF 331 creates a SM context and sends a response message 406 including an identifier of the SM context to the AMF 339.

4. The SMF 331 determines that the PCC authorization is required and requests to establish an SM policy association with the PCF 334 by sending a policy control creation request message 408 to the PCF 334.

5. The PCF 334 performs authorization based on UE subscription and local configuration and answers the policy control creation request 408 from the SMF 331 by sending a policy control response 410 to the SMF 331. In its response, the PCF 334 may provide PCC rules to the SMF 331 such that the SMF 331 may enforce the PCC rules.

6. The SMF 331 selects the PSA/UPF 338*a* based on the DNN. Then the SMF 331 sends a N4 session establishment request message 412 to the PSA/UPF 338*a*. The N4 session establishment request message 412 may include packet detection, enforcement and reporting rules to be installed on the PSA/UPF 338*a* for this PDU session. If core network (CN) tunnel information is allocated by the SMF 331, the session establishment request message 412 may further include the CN tunnel information.

7. Upon receiving the N4 session establishment request message 412, the PSA/UPF 338*a* acknowledges by sending a N4 session establishment response message 414 to the SMF 331. If the CN tunnel info is allocated by the PSA/UPF 338*a*, the session establishment response message 414 may include the CN tunnel information.

8. The SMF 331 then sends to the AMF 339 a transfer request message 416. The transfer request message 416 may for example include information parameters such as PDU session ID, information with respect to the communication interface between the AMF 339 and the RAN 322 (e.g., the N2 interface in FIG. 3), and N1 SM container. For example, the N2 information may include PDU session ID, CN tunnel information, QoS profiles, and corresponding QoS flow identities. The N1 SM container may include a PDU session establishment accept message that the AMF 339 shall provide to the UE 310.

9. AMF 339 sends to the RAN 322 a session access request 418 for the PDU session via, e.g., the N2 interface shown in FIG. 3. The session access request 418 may, for example, include information such as N2 SM information and NAS message including information such as the PDU session ID and N1 SM container containing the PDU session establishment accept message.

10. The RAN 322 issues access network specific signaling exchange with the UE 310 for UE session configuration that is related to the information received from SMF 331, as indicated in 420 of FIG. 4 For example, in case of a new radio RAN, a radio resource control (RRC) connection reconfiguration may take place with the UE for establishing the necessary new radio RAN resources related to the QoS rules for the session access request 418. The RAN 322 may also allocate tunnel information for the PDU session. RAN 320 may further forward the NAS message provided in step 9 above to the UE 310.

11. The RAN 322 then sends a session access response message 422 to the AMF 339 in response to the session access request 418 above in step 9. The session access response message may for example include information such as the PDU session ID, cause, and N2 SM information which may include the PDU session ID, access network tunnel information, and list of accepted/ rejected QFIs. The access network tunnel information corresponds to the access network address of the tunnel corresponding to the PDU session.

12. The AMF 339 then sends a context update request message 424 to the SMF 331. The context update request message 424 may for example include information such as N2 SM information. For example, the AMF 339 may forward the N2 SM information received from RAN 322 to the SMF 331. If the list of rejected QFIs is included in the N2 SM information, the SMF 331 shall release the rejected QoS profiles associated with the QFIs.

13. The SMF 331 then initiates an N4 session modification procedure with the PSA/UPF 338*a*, and sends access network tunnel information and corresponding forwarding rules to the PSA/UPF 338*a*.

At this point, the PDU session is successfully established and the UE 310 may use the established user plane for uplink and downlink data transmission to the application server 352 in the central data network 350.

Figure 5:
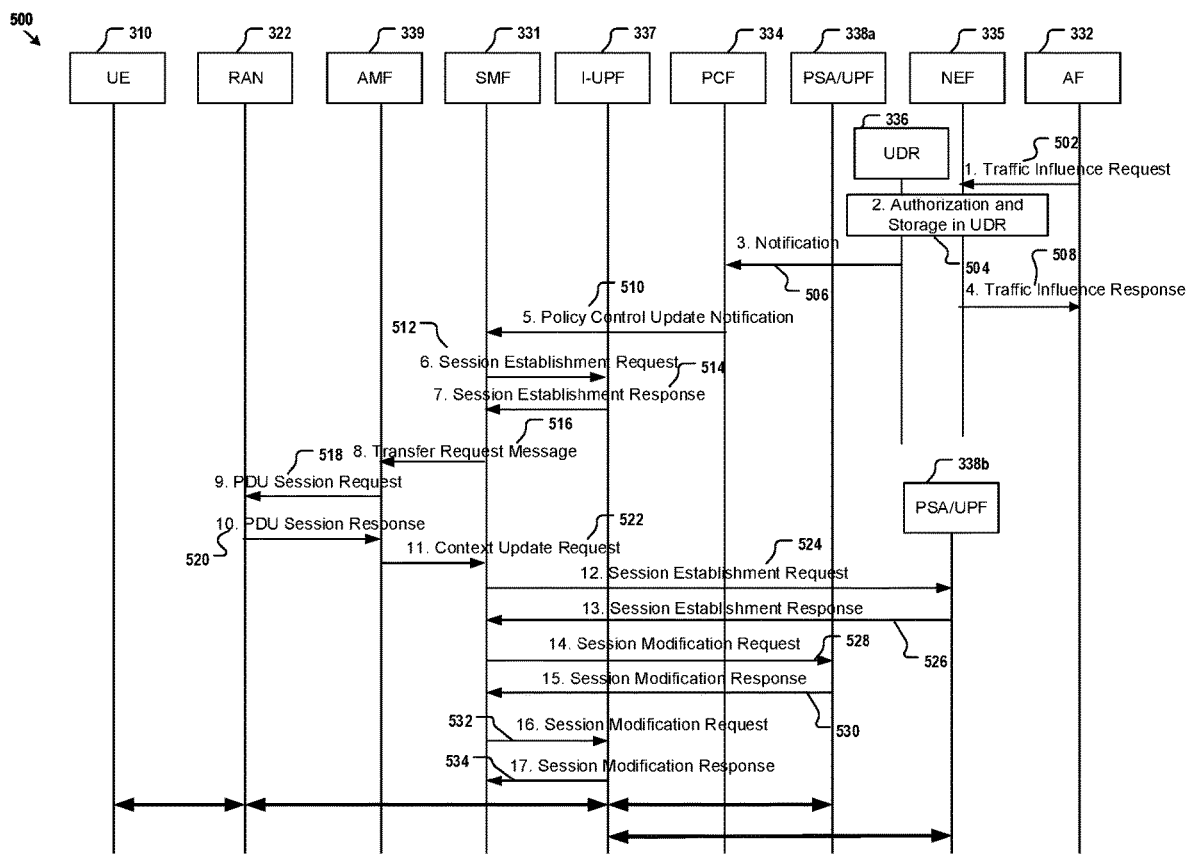
FIG. 5 illustrates an example data and logic flow for influencing data traffic routing for an application service in accordance with an embodiment.

FIG. 5 illustrates an example data and logic flow 500 for offloading UE data traffic to an anchor UPF connecting to an application server in a local data network 340 instead of that in the central data network 350. The example data and logic follow 500 may include the following steps.

1. As shown in FIG. 5, the AF 332 sends a data traffic routing influence request 502 to PCF 334 via NEF 312. In some implementation, the AF 332 may send the data traffic routing influence request 502 to PCF 334 directly. The information content of the data traffic routing influence request 502 may, for example, include:
  a. Information on identifying the data traffic. For example, the information may for example include a target DNN and possibly slicing information (S-NSSAI). Alternatively, the information may for example include an AF service identifier, i.e. an identifier of the application service on behalf of which the AF 332 is issuing the request. When the AF service identifier is included in the information, the NEF 332 will map it into a target DNN and S-NSSAI. Additionally, the information may include an application identifier or traffic filtering information. The application identifier refers to an application service handling user plane traffic and is used by the UPF to detect the traffic from the application service.
  b. Information on N6 data traffic routing requirements for the data traffic identified above. The information may for example include a routing profile ID for each of DNAIs for the data traffic. Alternatively or additionally, the information may include N6 data traffic routing information for each of the DNAIs.
  c. Information on potential locations of application services towards which the traffic routing should apply. The information may for example include a list of DNAIs which may be used for UPF selection.
  d. Information identifying the UEs that the request 502 targets. The UEs may include individual UEs, and the individual UEs may be identified by generic public subscription identifier (GPSI), IP address, IP prefix, or media access control (MAC) address. If the UEs are identified by GPSIs, the GPSIs may be mapped to SUPI according to the subscription information received from the UDM. In some implementations, the UEs may include one or more groups of UEs. When the AF 332 interacts with PCF 334 via NEF 335, each group of UEs may be identified by external group identifier. When the AF 332 interacts with PCF 334 directly, each group of UEs may be identified by internal group identifier. In some implementations, the UEs may include a specific type of UEs, for example all UEs accessing the combination of DNN, S-NSSAI and DNAIs. When the request 502 targets a specific type of UEs or groups of UE, the request 502 is likely to influence multiple PDU sessions possibly served by multiple SMFs and PCFs.
  e. Indication of application service relocation possibility. This indicates whether an application service can be relocated once a location of the application service is selected by the core network 330. If the application service relocation is not possible, the core network 330 shall ensure that for the traffic related to an application service, the data network access identifier (DNAI) will not be changed once selected for this application service.
  f. Information on subscription of AF 332 to related SMF events. The AF 332 may subscribe change of user plane path associated with the data traffic identified in the request 502. The information on subscription may include type of subscription, for example, subscription for early notification or late notification. In the case of a subscription for early notifications, the SMF 331 sends the notifications before a new user plane path is configured. In the case of a subscription for late notifications, the SMF 331 sends the notification after the new use plane path has been configured. Optionally, the information on subscription may further include an indication suggesting that the AF 332 will provide a response to the notifications of user plane path management events to the core network 330. Based on this indication, the SMF 331 may determine to wait for a response from the AF 332 before it activates the new user plane path.

2. As shown by 504 of FIG. 5, the NEF 335 ensures the necessary authorization control, performs throttling of requests from the AF 332, and maps from the request information provided by the AF into information recognized by the core network (for example, mapping from the AF-service-identifier to the DNN and S-NSSAI, or from external group identifier to internal group identifier, as described above). The NEF 312 stores the request information in the UDR 336.

3. As shown by 506 of FIG. 5, the PCF 334 subscribing to notification from UDR 336 receives a notification of application data change from the UDR 336 and may store the notification data locally.

4. As shown by 508 of FIG. 5, the NEF 335 responds to the AF 332 to acknowledge the receipt of the data traffic routing influence request 502.

5. Once the PCF 334 is notified of the new data traffic routing influence request, it determines if the existing PDU sessions established are potentially impacted or implicated by the new request. In particular, the PCF 334 updates the SMF 331 associated with the existing communication sessions with corresponding new PCC rules by sending a notification message 510. The notification message 510 may include information identifying the PDU session, information identifying the traffic which needs to be offloaded, and information of DNAI identifying which anchor UPF the traffic should be offloaded to. Additionally, if the data traffic influence request 502 includes a notification reporting request for user plane path change, the PCF 334 may include in the PCC rule the information required for reporting the event, including the notification target address pointing to the NEF 335 and the notification correlation ID containing the AF transaction internal ID.

6. Upon receiving the notification message 510 from the PCF 334, the SMF 331 performs an anchor UPF selection to select for example PSA/UPF 338b based on the requested DNAI and network address of the UE 310 included in the notification message 510. For example, the PSA/UPF 338b is selected because the PSA/UPF 338b is geographically close to the UE 310. The SMF may further select the I-UPF 337 that can perform ULCL or BP to offload traffic to PSA/UPF 338b. Due to the geographic proximity between the UE 310 and PSA/UPF 338b, data traffic transmission efficiency can be achieved. As shown in FIG. 5, the SMF 331 then sends to the I-UPF 337 a PDU session establishment request 512 which is intended to establish a PDU session with the I-UPF 337. If core network tunnel information for the PDU session is allocated by the SMF 331, the request 512 many include the core network tunnel information. Optionally, the request 512 may include traffic filters that are subject to offloading. The I-UPF 337 may use the traffic filters to identify the packets and forward the packets towards the local data network 340.

7. As shown by 514 in FIG. 5, the I-UPF 337 responds to the SMF 331 to acknowledge the receipt of the PDU session establishment request 512. If core network tunnel information for the PDU session is allocated by the I-UPF 337, the tunnel information may be provided to the SMF 331 in the response.

8. As shown by 516 in FIG. 5, the SMF 331 sends a transfer request message to the AMF 339. The transfer request message may for example include the PDU Session ID and N2 SM information. The N2 SM information carries information that the AMF 516 shall forward to the RAN 322 which may for example include the N3 core network tunnel Info of the I-UPF 337.

9. As shown by 518 in FIG. 5, the AMF 339 sends a PDU session request to RAN 322. The PDU session request may for example include the N2 SM information received from the SMF 331.

10. As shown by 520 in FIG. 5, the RAN 322 sends a PDU session response to the AMF 339. The PDU session response may for example include the PDU session ID and a N2 SM information. The N2 SM information carries information that the AMF 339 shall forward to the SMF 331 which may for example include the PDU session ID and cause.

11. As shown by 522 in FIG. 5, the AMF 339 sends a PDU session SM context update request to the SMF 331. The request may include the N2 SM information received from the RAN 322.

12. As shown by 524 in FIG. 5, upon receiving the PDU session SM context update request 522 from the AMF 339, the SMF 331 sends a N4 session establishment request to the PSA/UPF 338b. The request may for example include a N9 tunnel information of I-UPF 337.

13. As shown by 526 in FIG. 5, the PSA/UPF 338b responds to the SMF 331 to acknowledge the receipt of the session establishment request 524.

14. As shown by 528 in FIG. 5, the SMF 331 sends a N4 session modification request to the PSA/UPF 338a. The request may for example include a N9 tunnel information of I-UPF 337.

15. As shown by 530 in FIG. 5, the PSA/UPF 338a responds to the SMF 331 to acknowledge the receipt of the session modification request 528.

16. As shown by 532 in FIG. 5, the SMF 331 also sends a session modification request to the I-UPF 337. The request may for example include a N9 tunnel information of the PSA/UPF 338b.

17. As shown by 534 in FIG. 5, the I-UPF 337 responds to the SMF 331 to acknowledge the receipt of the session modification request 532.

After these steps, the I-UPF 337 may perform the ULCL or BP to offload UE data traffic towards the PSA/UPF 338b. The PSA/UPF 338b may further transmit the offloading traffic via N6 to the application server 342 in local data network 340. The application server 342 hosts the application service provided to the UE 310.

When the UE 310 roams within the wireless communication network 300. For example, the UE 310 moves from the RAN 322 to the RAN 324, the UE data traffic offloading via the PSA/UPF 338b towards the application server 342 may not be optimized because the PSA/UPF 338b is geographically close to the RAN 322 but far away from the RAN 324. Under the circumstance, it is desirable to offload the data traffic of the UE 310 to a PSA/UPF close to the RAN 324, for example the PSA/UPF 338c. To this end, the application service provided to the UE 310 needs to be relocated from the application server 342 to the application server 348 connecting to the PSA/UPF 338c such that the data traffic of the UE 310 may be switched to be offloaded towards the application server 348 via the PSA/UPF 338c.

Figure 6:
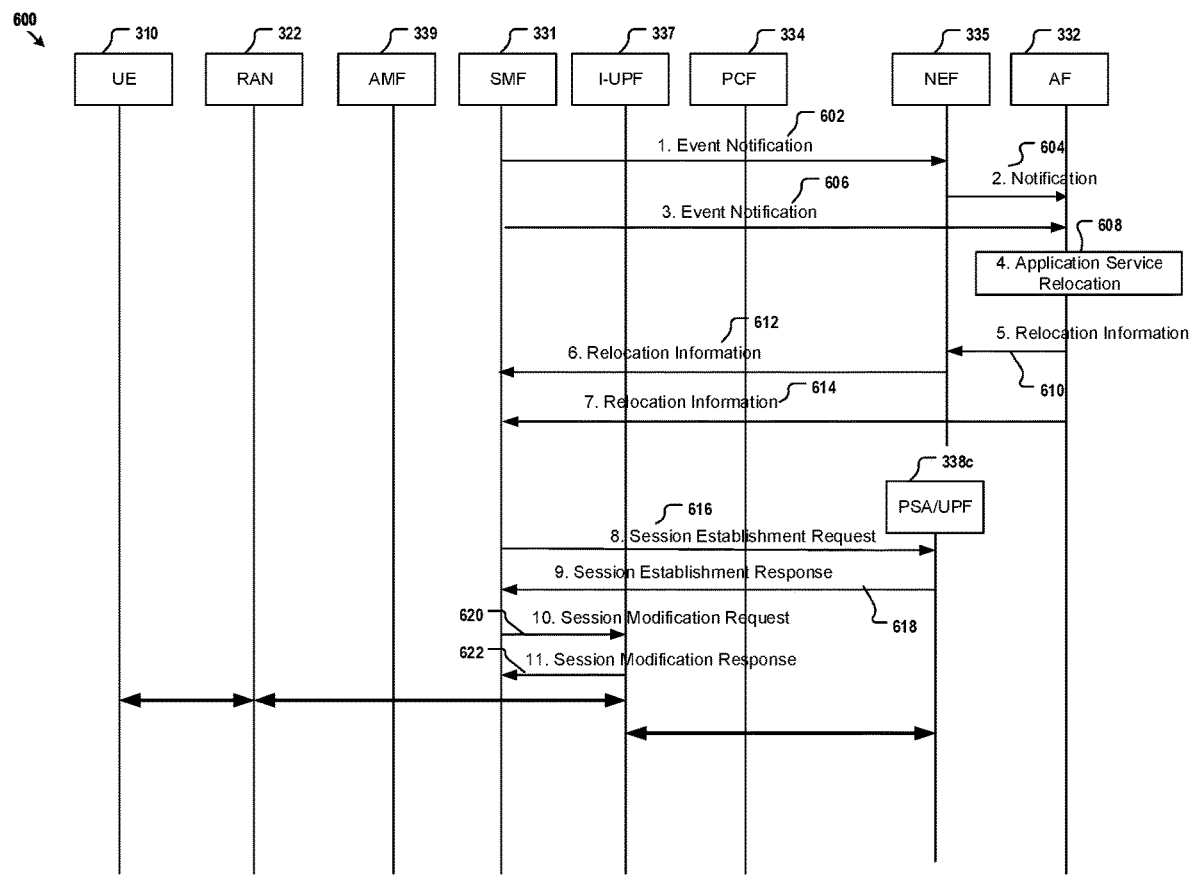
FIG. 6 illustrates example data and logic flow for influencing data traffic routing after relocation of an application service in accordance with an embodiment.
Figure 7:
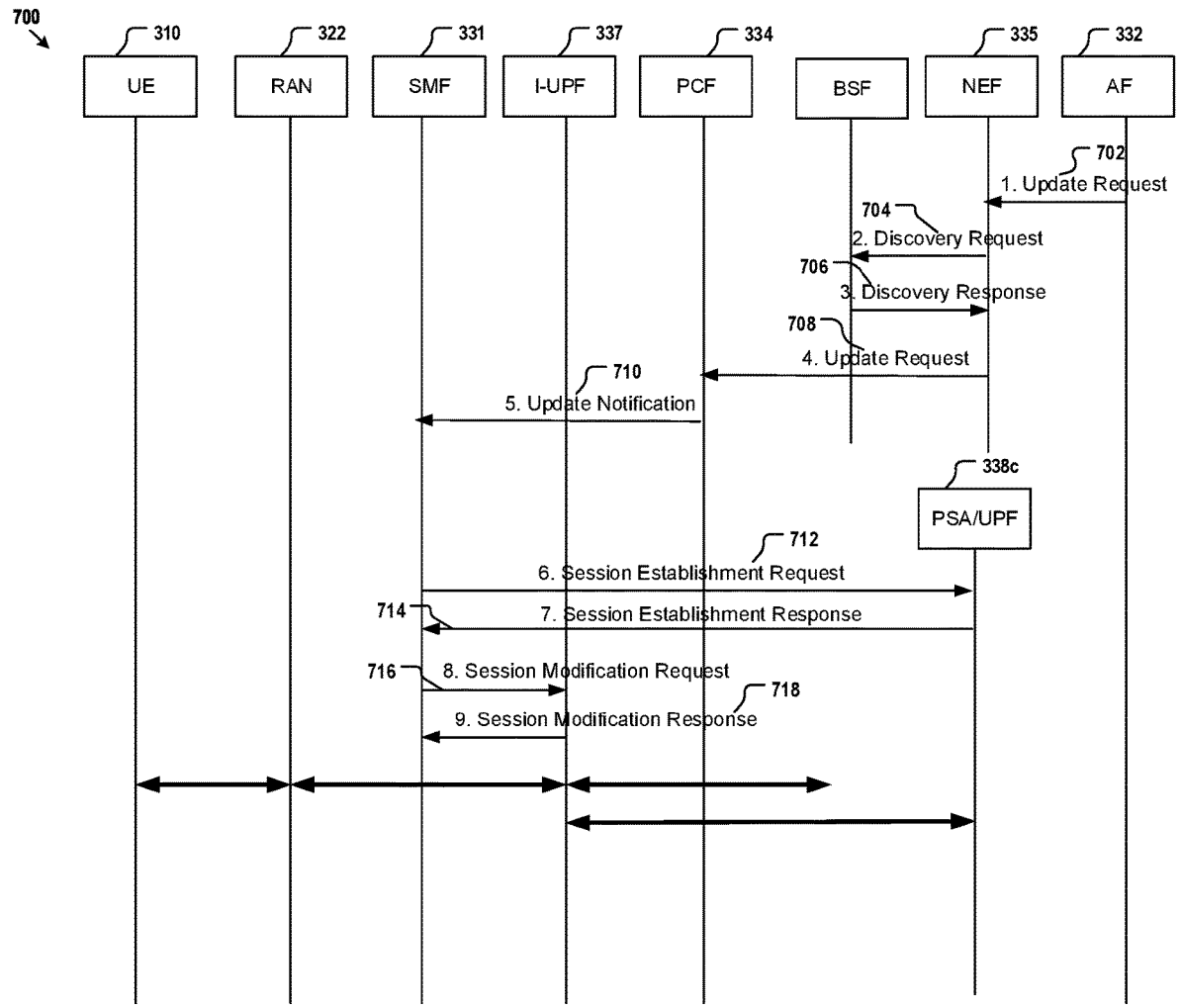
FIG. 7 illustrates example data and logic flow for influencing data traffic routing after relocation of an application service in accordance with an embodiment.

FIGS. 6 and 7 provide example data and logic flow for implementing the UE data traffic offloading switch towards a new application server after the application service provided to the UE is relocated to the new application server in the communication system 300 of FIG. 3. While these flow charts are discussed in the context of a particular example wireless communication network 300, the underlying principle applies to other wireless and non-wireless communication networks.

In an embodiment, the SMF 331 may send a relocating triggering event to the AF 332, which may trigger the AF 332 to relocate an application service to a new application server and returns the relocation information to the SMF 331. With the relocation information, the SMF 331 may configure the data traffic offloading path towards the new application server hosting the application service.

FIG. 6 provides example data and logic flows for implementing the data traffic offloading towards the new application server according to this embodiment. The data and logic flow 600 includes exemplary steps labeled from 1 to 11. Also in reference to the network functions or nodes in FIG. 3, the example data and logic flow 600 may include the following steps.

1. When the SMF 331 detects a relocation triggering event with respect to an application service, the SMF 331 may send a notification of the relocation triggering event to the AF 332 via the NEF 335. Specifically, the SMF 331 sends the notification of the relocation triggering event to the NEF 335 as shown by 602 in FIG. 6. In some implementations, the relocation triggering events may for example include that a communication session anchor (e.g. a PSA/UPF) has been established or releases, and that a DNAI for a PDU session between the UE and the PSA/UPF has changed. The notification of the relocation triggering event may include a list of target DNAIs supported by the SMF 331. Optionally, the notification of the relocation triggering event may also include a location information of the UE 310 such as a cell ID of the cell where the UE is currently located.

2. After receiving the notification of relocation triggering event from the SMF 331, the NEF 335 performs information mapping as applicable. For example, the AF transaction internal ID provided in notification correlation ID of the notification is mapped to the AF transaction external ID, and the SUFI in the notification is mapped to GPSI. Then the NEF 335 forwards the mapped notification of relocation triggering event to the AF 332 as shown by 604 in FIG. 6.

3. Alternatively, the SMF 331 may send the notification of the relocating triggering event to the AF 332 directly bypassing the NEF 335. Specifically, the SMF 331 sends the notification of the relocation triggering event to the AF 335 directly as shown by 606 in FIG. 6.

4. As shown by 608 in FIG. 6, based on the notification, the AF 332 performs a relocation for the application service. In some implementations, the AF 332 may perform the relocation for the application service based on the location information of the UE. For example, the AF 332 relocates the application service to the application server 348 because the application server 348 is geographically closer to the UE 310. As a result, a shorter data traffic routing path can be accomplished between the UE 310 and the application service thereby improving the service efficiency with respect to the UE 310. Then, the AF 332 may determine the target DNAI identifying the PSA/UPF that connects to the application server 348, for example, the PSA/UPF 338*c*. The AF 332 may further determine corresponding N6 data traffic routing between the PSA/UPF 338*c* and the application server 348 via which the uplink data traffic can reach to the application server 348.

5. As the response to the notification of the relocation triggering event sent in steps 1 and 2, the AF 332 may send the application service relocation information to the SMF 331 via the NEF 335. Specifically, the AF 332 sends the relocation information to the NEF 335 as shown by 610 in FIG. 6. The relocation information may for example include the target DNAI identifying the PSA/UPF 338*c* and the corresponding N6 data traffic routing between the PSA/UPF 338*c* and the application server 348. Additionally, in order to enable the data traffic offloading to the PSA/UPF 338*c*, the AF 332 may provide the network address of the application server 348 to the SMF 331 in the relocation information. For example, the relocation information may include a traffic filtering information (e.g. a 5 Tuple) which contains the network address of the application server 348. The network address of the application server 348 may for example be a IP address or a MAC address.

6. When the NEF 335 receives the relocation information from the AF 332, the NEF may trigger to forward the relocation information to the SMF 331 as shown by 612 in FIG. 6.

7. Alternatively, as the response to the notification of the relocation triggering event sent in step 3, the AF 332 may send the relocation information with respect to the application service to the SMF 331 directly, as shown by 614 in FIG. 6.

8. Upon receiving the relocation information from the AF 332 directly or the NEF 335 indirectly, the SMF 331 may reselect the PSA/UPF 338*c* according to the target DNAI in the relocation information. Then, the SMF 331 may send a N4 session establishment request message to the PSA/UPF 338*c* as shown by 616 in FIG. 6, which can be performed in a similar manner as the step 6 in the flow 400 with reference to FIG. 4. The N4 session establishment request message may for example include the N9 tunnel information of the I-UPF 337. If the SMF 331 allocates a new network address, for example an IPv6 address/prefix for the UE 310, the N4 session establishment request message may further include the new network address/prefix of the UE 310.

9. As shown by 618 in FIG. 6, the PSA/UPF 338*c* responds to the SMF 331 to acknowledge the receipt of the N4 session establishment request message, which can be performed in a similar manner to the step 7 in flow 400 with reference to FIG. 4. If the PSA/UPF 338*c* allocates a new network address, for example an IPv6 address/prefix for the UE 310, the response message may include the new network address/prefix of the UE 310.

10. Also, the SMF 331 sends a N4 session modification request message to the I-UPF 337. The N4 session modification request message may for example include a N9 tunnel information of the PSA/UPF 338*c*. To enable the uplink traffic offloading to PSA/UPF 338*c* under ULCL mode, the SMF 331 may provide for example the traffic filtering information including the network address of the application server 348 to I-UPF 337 in the N4 session modification request message. To enable the uplink traffic offloading to PSA/UPF 338*c* under BP mode, the SMF 331 may provide for example traffic filtering information including the new IPv6 address/prefix of the UE 310 in the N4 session modification request message. Alternatively, the SMF 331 may provide for example the new IPv6 address/prefix of the UE 310 and the rules of routing to the UE 310 in the N4 session modification request message. The routing rules may for example include the network address of the application server 338*c* where the application service is relocated.

11. Based on the N4 session modification request message received from the SMF 331, the I-UPF 337 updates its forwarding rules with respect to the data traffic of the UE 310 such that the data traffic of the UE can be offloaded to the PSA/UPF 338*c*. Then the I-UPF 337 may respond to the SMF 331 to acknowledge the receipt of the N4 session modification request message as shown by 622 in FIG. 6.

After these steps, the I-UPF 337 may perform the ULCL or BP to offload UE data traffic towards the PSA/UPF 338*c*. The PSA/UPF 338*c* may further transmit the offloading traffic via N6 interface to the application server 348 in the local data network 340.

In another embodiment, instead of receiving the notification of the relocation triggering event to trigger the application service relocation, the AF 332 may initiate the application service relocation by detecting a relocation triggering event by itself, for example, detecting that the UE 310 roams from the RAN 322 to the RAN 324. As such, after relocating the application service provided to the UE 310 to a new application server, the AF 332 may send an update notifying the application service relocation to the core network 330 so as to enable to offload the data traffic of the UE 310 to the new application server.

FIG. 7 provides example data and logic flows for implementing the data traffic offloading towards the new application server according to this embodiment. The data and logic flow 700 includes exemplary steps labeled from 1 to 9. Also in reference to the network functions or nodes in FIG. 3, the example data and logic flow 700 may include the following steps.

1. After relocating the application service provided to the UE 310 to the application server 348, the AF 332 may send the relocation update request message to the PCF 334 via the NEF 335. Specifically, the AF 332 sends the relocation update request message to the NEF 335 as shown by 702 in the FIG. 7. Alternatively, the AF 332 may send the relocation update request message to the PCF 334 directly. The update request message may for example include the target DNAI identifying the PSA/UPF 338c connecting to the PSA/UPF 338c and the corresponding N6 data traffic routing between the PSA/UPF 338c and the application server 348. Additionally, in order to enable the data traffic offloading to the PSA/UPF 338c, the AF 332 may provide the network address of the application server 348 to the PCF 334 in the relocation update request message. For example, the relocation update request message may include a traffic filtering information (e.g. a 5 Tuple) which contains the network address of the application server 348. The network address of the application server 348 may for example be an IP address or a MAC address.

2. When the NEF 335 receives the relocation update request message from the AF 332, the NEF 335 ensures that the relocation update request has necessary authorization in the core network 300, and maps the information in the relocation request message to the information needed in the core network 300. For example, the AF transaction internal ID provided in the update request message is mapped to the AF transaction external ID, and the SUPI in the update request message is mapped to GPSI. Then the NEF 335 may find out the address of the PCF corresponding to this relocation update request in its local configuration. If the address of the PCF is not available in local, the NEF 335 may send a discovery request for the PCF address to the binding support function (BSF) as shown by 704 in FIG. 7. The discovery request may for example include an address of the UE 310.

3. Based on the address of the UE 310 in the discovery request, the BSF finds out the address of the PCF corresponding to the UE 310, for example, the PCF 334. Then the BSF sends a discovery response including the address of the PCF 334 to the NEF 335 as shown by 706 in FIG. 7.

4. After obtaining the address of the PCF 334, the NEF 335 sends the mapped relocation update request message to the PCF 334 as shown by 708 in FIG. 7. Optionally, the PCF 334 may respond to the NEF 335 to acknowledge the receipt of the update request message.

5. As shown by 710 in FIG. 7, the PCF 334 sends an update message notifying the relocation to the SMF 331, which may be performed in a similar manner as the step 5 of the flow 500 with reference to FIG. 5. The update message may for example include relocation information such as new PCC rules corresponding to the relocation.

6. Upon receiving the update message notifying the relocation from the PCF 334, the SMF 331 may reselect the PSA/UPF 338c according to the target DNAI in the relocation information. Then, the SMF 331 may send a N4 session establishment request message to the PSA/UPF 338c as shown by 712 in FIG. 7, which can be performed in a similar manner as the step 6 in the flow 400 with reference to FIG. 4. The N4 session establishment request message may for example include the N9 tunnel information of the I-UPF 337. If the SMF 331 allocates a new network address, for example an IPv6 address/prefix for the UE 310, the N4 session establishment request message may further include the network address of the UE 310.

7. As shown by 714 in FIG. 7, the PSA/UPF 338c responds to the SMF 331 to acknowledge the receipt of the N4 session establishment request message, which can be performed in a similar manner to the step 7 in flow 400 with reference to FIG. 4. If the PSA/UPF 338c allocates a new network address, for example a IPv6 address/prefix for the UE 310, the response message may include the new network address/prefix of the UE 310.

8. Also, the SMF 331 sends a N4 session modification request message to the I-UPF 337 as shown by 716 in FIG. 7. The N4 session modification request message may for example include a N9 tunnel information of the PSA/UPF 338c. To enable the uplink traffic offloading to PSA/UPF 338c under ULCL mode, the SMF 331 may provide for example the traffic filtering information including the network address of the application server 348 to I-UPF 337 in the N4 session modification request message. To enable the uplink traffic offloading to PSA/UPF 338c under BP mode, the SMF 331 may provide for example traffic filtering information including the new IPv6 address/prefix of the UE 310 in the N4 session modification request message. Alternatively, the SMF 331 may provide for example the new IPv6 address/prefix of the UE 310 and the rules of routing to the UE 310 in the N4 session modification request message. The routing rules may include the network address of the application server 338c where the application service is relocated.

9. Based on the N4 session modification request message received from the SMF 331, the I-UPF 337 updates its forwarding rules with respect to the data traffic of the UE 310 such that the data traffic of the UE can be offloaded to the PSA/UPF 338c. Then the I-UPF 337 may respond to the SMF 331 to acknowledge the receipt of the N4 session modification request message as shown by 716 in FIG. 7.

After these steps in the flow 700, the I-UPF 337 may perform the ULCL or BP to offload UE data traffic towards the PSA/UPF 338c. The PSA/UPF 338c may further transmit the offloading traffic via N6 interface to the application server 348 in the local data network 340.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed in a mobile core network comprising a communication session control node and an application service node, the method comprising:
   transmitting, by the communication session control node, a message comprising a list of candidate target data network access identifiers that the communication session control node supports to the application service node for notifying a relocation triggering event, the relocation triggering event triggers the application service node to:
   select a target data network access identifier from the list of candidate target data network access identifiers, and
   relocate an application service provided to a user equipment in a pre-established communication session from a previous application hosting server to a new application hosting server outside of the mobile core network based on the target data network access identifier; and
   receiving, by the communication session control node, a relocation information from the application service node, wherein the relocation information comprises a network address of the new application hosting server.

2. The method of claim 1, wherein the mobile core network further comprises an intermediate user plane node, the method further comprises:
   transmitting, by the communication session control node, the network address of the new application hosting server to the intermediate user plane node.

3. The method of claim 1, wherein the relocation triggering event comprises:
   a communication session anchor identified in a subscription of the application service node has been established or releases; or
   a data network access identifier used in the pre-established communication session has changed.

4. The method of claim 1, wherein the message for notifying the relocation triggering event further comprises a location information of the user equipment.

5. The method of claim 1, wherein the mobile core network further comprises a plurality of anchor user plane nodes, the relocation information further comprises the target data network access identifier and a traffic routing information corresponding to the target data network access identifier, the target data network access identifier identifies one of the plurality of anchor user plane nodes that is associated with the new application hosting server.

6. The method of claim 5, further comprising establishing, by the communication session control node, a communication session between the user equipment and the anchor user plane node identified by the target data network access identifier.

7. The method of claim 1, wherein the relocation information further comprises a traffic filtering information and the network address of the new application hosting server is included in the traffic filtering information.

8. The method of claim 1, wherein the mobile core network further comprises a network exposure node, the transmitting the message for notifying the relocation triggering event comprises transmitting the message for notifying the relocation triggering event to the application service node via the network exposure node.

9. The method of claim 8, wherein the receiving the relocation information comprises receiving the relocation information from the application service node via the network exposure node.

10. A method performed in a mobile core network comprising a communication session control node and an application service node, the method comprising:
    receiving, by the application service node, from the communication session control node a message for notifying a relocation triggering event, the message comprising a list of candidate target data network access identifiers that the communication session control node supports;

in response to the relocation triggering event, selecting, by the application service node, a target data network access identifier from the list of candidate target data network access identifiers;

relocating, by the application service node, an application service provided to the user equipment in pre-established communication session from a previous application hosting server to a new application hosting server outside of the mobile core network based on the target data network access identifier; and transmitting, by the application service node, a relocation information to the communication session control node, wherein the relocation information comprises a network address of the new application hosting server.

11. The method of claim 10, wherein the message for notifying a relocation triggering event further comprises a location information of the user equipment, the relocating the application service comprises relocating the application service to the new application hosting server based on the location information of the user equipment.

12. The method of claim 10, wherein the mobile core network comprises a plurality of anchor user plane nodes, the target data network access identifier identifies one of the plurality of anchor user plane nodes that is associated with the new application hosting server.

13. The method of claim 12, wherein the relocation information further comprises the target data network access identifier and a traffic routing information corresponding to the target data network access identifier.

14. The method of claim 10, wherein the mobile core network further comprises a network exposure node, the receiving the message for notifying the relocation triggering event comprises receiving the message for notifying the relocation triggering event from the communication session control node via the network exposure node.

15. The method of claim 14, wherein the transmitting the relocation information comprises transmitting the relocation information to the communication session control node via the network exposure node.

* * * * *